United States Patent [19]

Brunelle et al.

[11] Patent Number: 5,142,024
[45] Date of Patent: Aug. 25, 1992

[54] STABILIZATION OF CYCLIC POLYCARBONATES WITH ORGANIC CARBOXYLIC OR SULFONIC ACIDS

[75] Inventors: Daniel J. Brunelle, Scotia; David K. Bonauto, New York, both of N.Y.

[73] Assignee: General Electric Company, Schenactady, N.Y.

[21] Appl. No.: 653,557

[22] Filed: Feb. 11, 1991

Related U.S. Application Data

[63] Continuation-in-part of Ser. No. 631,990, Dec. 2, 1990, abandoned.

[51] Int. Cl.⁵ ............................................. C08G 64/38
[52] U.S. Cl. ............................. 528/371; 252/182.23; 252/182.29; 528/370
[58] Field of Search ............................. 528/371, 370; 252/182.23, 182.29

[56] References Cited

U.S. PATENT DOCUMENTS

| | | |
|---|---|---|
| 3,155,683 | 11/1964 | Moody . |
| 3,386,954 | 6/1968 | Schnell et al. . |
| 4,644,053 | 2/1987 | Brunelle et al. . |
| 4,727,134 | 2/1988 | Brunelle et al. . |
| 4,746,726 | 5/1988 | Evans et al. . |
| 4,814,428 | 3/1989 | Fontana et al. . |
| 4,816,548 | 3/1989 | Evans et al. . |
| 4,831,001 | 5/1989 | Evans et al. . |
| 4,839,462 | 6/1989 | Evans et al. . |
| 4,849,502 | 7/1989 | Evans et al. .................. 528/371 |
| 4,912,198 | 3/1990 | Fontana . |
| 5,087,692 | 2/1992 | Stewart et al. ................ 528/371 |

*Primary Examiner*—Harold D. Anderson
*Attorney, Agent, or Firm*—William H. Pittman; James C. Davis, Jr.

[57] ABSTRACT

The thermal stability of cyclic polycarbonate oligomers may be increased by reacting the oligomers with an effective amount of organic carboxylic or sulfonic acids.

18 Claims, No Drawings

STABILIZATION OF CYCLIC POLYCARBONATES WITH ORGANIC CARBOXYLIC OR SULFONIC ACIDS

This application is a continuation in part of Ser. No. 07/631,990, filed Dec. 21, 1990, now abandoned.

TECHNICAL FIELD

This invention relates to methods of increasing the thermal stability of cyclic polycarbonate oligomers.

BACKGROUND OF THE INVENTION

Cyclic polycarbonate oligomers are very useful in the preparation of polycarbonates. For example, U.S. Pat. Nos. 3,155,683 and 3,386,954 disclose the preparation of low molecular weight cyclic aromatic carbonate polymers and their subsequent conversion to linear polycarbonates. Furthermore, U.S. Pat. No. 4,644,053 discloses cyclic oligomer compositions which are especially suitable for conversion to high molecular weight linear polycarbonates because of their very low inherent viscosity. For example, these mixtures of cyclic oligomers can be simultaneously polymerized with an initiator and molded to produce polycarbonate articles having the highly desirable physical properties possessed by polycarbonates prepared by conventional methods.

However, one drawback associated with polycarbonate preparation from cyclic oligomers is the chemical instability of these oligomers in the melt phase, i.e., in a molten state prior to conversion to higher molecular weight linear polycarbonates. The oligomers often undergo autopolymerization at elevated temperature above about 250° C., even in the absence of a polymerization initiator. It is believed that impurities present in the cyclics or introduced from the environment act as substitute initiators which induce polymerization prior to utilization of the mixture. High initial viscosities prevent the rapid flow of the cyclic oligomer mixture into mold cavities, thereby causing considerable delays in mold processing operations.

The washing of the cyclic oligomeric mixture with a dilute solution of an acid appears to eliminate some of the impurities which cause instability in the mixture. However, even after multiple washes, residual impurities remain which continue to cause slow polymerization with an accompanying increase in viscosity, especially at temperatures of about 300° C.

U.S. Pat. No. 4,814,428 discloses a method of increasing the thermal stability of cyclic carbonate oligomers by treating these cyclic oligomers with an effective amount of anhydrous hydrogen halide in an effort to neutralize any impurities which may result from the reaction used in forming cyclic oligomers (i.e., usually phenoxideterminated linear carbonate oligomers). However, anhydrous hydrogen halide is extremely corrosive and thus is frequently not commercially viable.

It is also known in the art that the melt stability of cyclic polycarbonate oligomers may be improved when phenols, diaryl carbonates with electron withdrawing groups, lewis acids, or phosphates are introduced as additives. However, additives have been found to decrease the thermal and hydrolytic stability of the final polymer.

Therefore, the present invention provides a method of preparing melt stable cyclic polycarbonate oligomers which is neither corrosive nor requires any additives.

SUMMARY OF THE INVENTION

"Thermal stability" as used herein refers to the characteristic wherein less than about 5% polymerization occurs in a cyclic carbonate oligomer mixture after the mixture has been held at 250° C. for 60 minutes; and less than about 40% polymerization occurs after the mixture has been held at 300° C. for 30 minutes. The degree of polymerization is measured by gel permeation chromatography (GPC), as described below in the examples.

The present invention provides a method for preparing cyclic polycarbonate oligomers having increased thermal stability which includes contacting at least one cyclic polycarbonate oligomer with an effective amount of an organic acid having a pKa of below about 6 and preferably about $-3$ to $+4$, to substantially prevent the above-mentioned polymerization. Illustrative organic acids include organic carboxylic and sulfonic acids. Suitable organic acids include aliphatic acids having from about 2 to 6 carbon atoms, acetic acid, methanesulfonic acid, benzenesulfonic acid, propionic acid, anhydrous p-toluenesulfonic acid, and trifluoromethanesulfonic acid.

The cyclic polycarbonate oligomer compositions useful in the method of this invention and their preparation are described in U.S. Pat. No. 4,644,053 and U.S. Pat. No. 4,727,134 incorporated herein by reference. These cyclic polycarbonate oligomers generally comprise a plurality of structural units of the formula

wherein at least about 60% of the total number of R values are divalent aromatic organic radicals, the balance thereof being aliphatic, alicyclic or aromatic organic radicals. Such compositions include dimers, trimers and tetramers, as well as cyclic polycarbonate oligomer mixtures.

The R values may be different but are usually the same for cyclic polycarbonate oligomer compositions and may be aliphatic, alicyclic, aromatic or mixed; those which are aliphatic or alicyclic generally contain up to about 8 carbon atoms. Suitable R values include ethylene, propylene, trimethylene, tetramethylene, hexamethylene, dodecamethylene, 1,4-(2-butylene), 1,10,-(2-ethyldecylene), 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like and also linking radicals such as thio, sulfoxy, sulfone, ester, amide, ether and carbonyl. Most often, however, all R radicals are hydrocarbon radicals.

Preferably at least about 80% of the total number of R values in the cyclic oligomer mixtures, and most desirably all of said R values, are aromatic. The aromatic R radicals preferably have the formula

where each of $A^1$ and $A^2$ is a monocyclic divalent aromatic radical and Y is a bridging radical in which one or two atoms separate $A^1$ from $A^2$. The free valence bonds in formula II are usually in the meta or para positions of A1 and A2 in relation to Y.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred Both $A^1$ and $A^2$ are preferably p-phenylene, although both may be o or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]bicycloheptylmethylene, ethylene, isopropylidene, neopentylidene, cyclohexylidene, cyclopentadecylidene, cyclododecylidene or adamantylidene, especially a gemalkylene (alkylidene) radical. Also included, however, are unsaturated radicals and radicals which contain atoms other than carbon and hydrogen. Examples of such radicals are 2,2-dichloroethylidene, carbonyl, thio and sulfone. For reasons of availability and particular suitability for the purposes of this invention, the preferred radical of formula II is the 2,2-bis(4-phenylene)propane radical, which is derived from bisphenol A and in which Y is isopropylidene and $A^1$ and $A^2$ are each p-phenylene.

The cyclic oligomer mixtures are generally made up of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above about 300° C. and most often at temperatures above about 225° C.

The cyclic oligomer mixtures contain very low proportions of linear oligomers. In general, no more than about 5% of such linear oligomers, if any, are present.

The mixtures also usually contain low percentages, if any, of polymers (linear or cyclic) having a degree of polymerization greater than about 30. For the uses of this invention, which often require relatively very low viscosities at the temperatures at which the oligomers are liquid, it is usually preferred and sometimes essential for the proportion of such polymers having a high degree of polymerization to be low, generally no higher than about 5%. Removal of such polymers, when necessary, to make polymer free oligomer mixtures, is easily achieved by precipitation with a non-solvent as disclosed, for example, in U.S. Pat. No. 4,644,053, the disclosure of which is incorporated herein by reference.

Further methods for the preparation of cyclic carbonate oligomer mixtures are known in the art and are described in detail, for example, in U.S. Pat. No. 4,727,134 described above, as well as in U.S. Pat. No. 4,696,998. For example, the cyclic oligomers may be formed by reacting a bishaloformate such as bisphenol A bischloroformate with triethylamine and aqueous sodium hydroxide. Typically, such a reaction is carried out in a non-polar solvent such as methylene chloride or chloroform. When the reaction is complete, the solution of the crude product is generally separated and washed one or more times with dilute portions of an acid.

In the method of the present invention, treatment of the cyclics with the organic acid is most often carried out while the cyclics are dissolved in the reaction solvent utilized for their preparation. It is thought that most of the impurities, which can cause premature polymerization without a catalyst, have been introduced into the solution during the formation of the cyclics. However, this process may also be used to treat cyclics which have already been separated from the reaction solvent and then re-dissolved in more solvent.

It is believed that the impurities for the most part are anionic and may comprise phenoxide-terminated linear polycarbonate oligomers and that these species are by-products of the reaction used in forming the cyclic oligomers. Treatment with effective amounts of the organic acids appears to neutralize these species, thereby resulting in thermal stability. Therefore, the method of the present invention is useful in preventing the auto-polymerization of the cyclic polycarbonate oligomers by neutralizing these phenoxide anions, thus rendering the cyclic polycarbonate oligomers melt stable.

An effective amount is defined to be an amount sufficient to render the cyclic polycarbonates thermally stable, i.e., to substantially prevent auto-polymerization of the oligomers. Generally, at least about 0.1 mole percent of the organic acid per total moles of the cyclic polycarbonate oligomers present is employed.

The present invention further provides a composition including an organic solvent solution of cyclic polycarbonate oligomers described above and an organic acid having a pKa of below about 6. Suitable organic acids include carboxylic and sulfonic acids such as aliphatic acids having from about 2 to 6 carbon atoms, acetic acid, methanesulfonic acid, benzenesulfonic acid, propionic acid, anhydrous p-toluenesulfonic acid, and trifluoromethanesulfonic acid mentioned herein above. Preferrably an amount greater than about 0.1 mole percent of the organic acid per total moles cyclic polycarbonate oligomers is added to the solution.

In order that those skilled in the art may be better able to practice the present invention, the following examples are given as illustrations of the increased thermal stability of polycarbonate cyclics exhibited when employing the method of the present invention. It should be noted that the invention is not limited to the specific details embodied in the examples.

EXAMPLE 1

Five grams of bisphenol A (BPA) cyclic polycarbonate was dissolved in 100 ml of methylene chloride. This solution was stirred and 1 percent of methanesulfonic acid added. This mixture was allowed to stir for 20 minutes. The samples were washed with deionized water until the pH of the aqueous layer remained constant. The polycarbonate cyclics were isolated via steam crumbing and dried in a vacuum oven at 110° C. for 18hrs.

1.0 gram of the acid treated polycarbonate was placed in an acid washed petri dish and placed in an oven at 300° C. After a half hour the sample was removed and allowed to cool to room temperature. The sample was dissolved in chloroform and analyzed via gel permeation chromatography (GPC) for polycarbonate content.

1.0 gram of the acid treated polycarbonate cyclics and 4.4 mg of borate initiator were dissolved in 25 ml of CH$_2$Cl$_2$. The solvent was removed and the samples further dried in a 110° C. vacuum oven for 18 hrs. The material was placed in the polymerization vessel and heated at 310° C. for 15 minutes. The polymer was characterized via GPC. The results are summarized in Table 1 below.

EXAMPLE 2

Example 2 was prepared in a manner similar to Example 1 except 0.5 percent methanesulfonic acid was added to the BPA cyclic polycarbonate.

EXAMPLE 3

Example 3 was prepared in a manner similar to Example 1 except 0.2 percent methanesulfonic acid was added to the BPA cyclic polycarbonate.

EXAMPLE 4

Example 4 was prepared in a manner similar to Example 1 except 0.1 percent methanesulfonic acid was added to the BPA cyclic polycarbonate.

EXAMPLE 5

Example 5 was prepared in a manner similar to Example 1 except 0.05 percent methanesulfonic acid was added to the BPA cyclic polycarbonate.

EXAMPLE 6

Example 6 was prepared in a manner similar to Example 1 except 1.0 percent trifluoromethanesulfonic (Triflic) acid was added to the BPA cyclic polycarbonate.

EXAMPLE 7

Example 7 was prepared in a manner similar to Example 1 except 1.0 percent p-toluenesulfonic acid was added to the BPA cyclic polycarbonate.

EXAMPLE b 8

Example 8 was prepared in a manner similar to Example 1 except 1.0 percent acetic acid was added to the BPA cyclic polycarbonate.

EXAMPLE 9

Example 9 was prepared in a manner similar to Example 1 except 0.5 percent acetic acid was added to the BPA cyclic polycarbonate.

EXAMPLE 10

Example 10 was prepared in a manner similar to Example 1 except 0.1 percent acetic acid was added to the BPA cyclic polycarbonate.

EXAMPLE 11

5.0 percent HCl was stirred with BPA polycarbonate cyclic oligomers in a blender for 10 minutes at high speed, and subsequently washed with water until neutral. Then the cyclic polycarbonates were isolated by steam crumbing. After drying these cyclic polycarbonates were tested for melt stability and polymerizability by heating at 300° C. for 30 minutes.

EXAMPLE 12

Example 12 was prepared in a manner similar to Example 11 except that concentrated HCl was stirred with the BPA polycarbonate cyclic oligomers.

EXAMPLE 13

Example 13 was prepared in a manner similar to Example 11 except that anhydrous HCl was stirred with the BPA polycarbonate cyclic oligomers.

TABLE 1

Acid Treatment of Polycarbonate Cyclics with Organic Acids

| Test Sample | | % polymer after 30 min. @ 300° C. | % polymer with 0.2% borate |
|---|---|---|---|
| | Control | 58% | — |
| Example 1 | 1% MeSO$_3$H | 2% | 100% |
| Example 2 | 0.5% MeSO$_3$H | 0% | 100% |
| Example 3 | 0.2% MeSO$_3$H | 7% | 100% |
| Example 4 | 0.1% MeSO$_3$H | 59% | 100% |
| Example 5 | 0.05% MeSO$_3$H | 49% | 100% |
| Example 6 | 1.0% Triflic acid | 3% | 99% |
| Example 7 | 1.0% p-TsOH | 39% | 100% |
| Example 8 | 1.0% Acetic Acid | 1% | 100% |
| Example 9 | 0.5% Acetic Acid | 36% | 100% |
| Example 10 | 0.1% Acetic Acid | 0% | 99% |
| Example 11 | 5% HCl | 20% | — |
| Example 12 | Concentrated HCl | 4% | — |
| Example 13 | Anhydrous HCl | 3% | — |

The data in Table 1 illustrates that methanesulfonic acid is very effective at neutralizing polycarbonate cyclics, even when used at low levels. Examples 11 through 13 are included for comparative purposes to further demonstrate the effectiveness of the examples of the present invention. Methanesulfonic acid should be much more convenient to use than anhydrous HCl, since it is a high boiling liquid (167° C./10mm), rather than a noxious gas. Acetic acid afforded melt stable cyclics, particularly when CH$_2$Cl$_2$ solution was treated with levels about 0.1% or 1%. Acetic acid offers an even greater advantage than methanesulfonic acid, since it is a much weaker acid, is very inexpensive, and traces can be removed by drying or distillation.

Obviously, other modifications and variations of the present inventions are possible in light of the above teachings. It is therefore to be understood that changes may be made in particular embodiments of the invention described which are within the full intended scope of the invention as defined by the claims. It is to be understood further that all patents mentioned above are to be incorporated herein by reference.

What is claimed is:

1. A method for preparing melt-stable cyclic polycarbonate oligomers comprising contacting an organic solvent solution of cyclic polycarbonate oligomers with an amount of organic carboxylic or sulfonic acid, having a pKa of below about 6, effective to suppress polymerization in the absence of a catalyst.

2. A method according to claim 1 wherein the organic acid is selected from the group consisting of an aliphatic acid having from about 2 to 6 carbon atoms, methanesulfonic acid, benzenesulfonic acid, propionic acid, anhydrous p-toluenesulfonic acid, and trifluoromethanesulfonic acid.

3. A method according to claim 1 wherein at least about 0.1 mole percent of the organic acid per total moles cyclic polycarbonate oligomers is added to the solution.

4. A method according to claim 1 wherein an amount greater than about 0.1 mole percent of methanesulfonic acid per total moles cyclic polycarbonate oligomers is added to the solution.

5. A method according to claim 1 wherein about 0.1 mole percent of trifluoromethanesulfonic acid per total moles cyclic polycarbonate oligomers is added to the solution.

6. A method according to claim 1 wherein the cyclic polycarbonate oligomers are a mixture of oligomers free from linear polymers above a degree of polymerization greater than about 30.

7. A method according to claim 1 wherein the cyclic polycarbonate oligomers comprise structural units of the formula

(I)

wherein at least about 60% of the total number of R values are divalent aromatic organic radicals, the balance of the R values being aliphatic, alicyclic, or aromatic.

8. A method according to claim 7 wherein R is $A^1$-Y-$A^2$ wherein each $A^1$ and $A^2$ is a monocyclic divalent aromatic radical and Y is a bridging radical in which on or two atoms separate $A^1$ and $A^2$.

9. A method according to claim 7 wherein each $A^1$ and $A^2$ is p-phenylene and Y is isopropylidene.

10. A composition comprising an organic solvent solution of cyclic polycarbonate oligomers and an organic carboxylic or sulfonic acid having a pKa of below about 6.

11. The composition of claim 10 wherein the organic acid is selected from the group consisting of an aliphatic acid having from about 2 to 6 carbon atoms, methanesulfonic acid, benzenesulfonic acid, propionic acid, anhydrous p-toluenesulfonic acid, and trifluoromethanesulfonic acid.

12. The composition of claim 10 wherein at least about 0.1 mole percent of the organic acid per total moles cyclic polycarbonate oligomers is added to the solution.

13. The composition of claim 10 wherein an amount greater than about 0.1 mole percent of methanesulfonic acid per total moles cyclic polycarbonate oligomers is added to the solution.

14. The composition of claim 10 wherein about 0.1 mole percent of trifluoromethanesulfonic acid per total moles cyclic polycarbonate oligomers is added to the solution.

15. The composition of claim 10 wherein the cyclic polycarbonate oligomers are a mixture of oligomers free from linear polymers above a degree of polymerization greater than about 30.

16. The composition of claim 10 wherein the cyclic polycarbonate oligomers comprise structural units of the formula

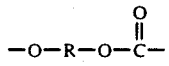
(I)

wherein at least about 60% of; the total number of R values are divalent aromatic organic radicals, the balance of the R values being aliphatic, alicyclic, or aromatic.

17. The composition of claim 16 wherein R is $A^1$-$A^2$ wherein each $A^1$ and $A^2$ is a monocyclic divalent aromatic radical and Y is a bridging radical in which on or two atoms separate $A^1$ and $A^2$.

18. The composition of claim 17 wherein each $A^1$ and $A^2$ is p-phenylene and Y is isopropylidene.

* * * * *